US008456593B2

(12) United States Patent
Park et al.

(10) Patent No.: US 8,456,593 B2
(45) Date of Patent: Jun. 4, 2013

(54) TRANSPARENT DISPLAY DEVICE

(75) Inventors: Se-Hong Park, Gyeonggi-Do (KR); Eung-Do Kim, Gyeonggi-Do (KR); Jong-Sin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 274 days.

(21) Appl. No.: 12/980,501

(22) Filed: Dec. 29, 2010

(65) Prior Publication Data

US 2011/0261291 A1   Oct. 27, 2011

(30) Foreign Application Priority Data

Apr. 23, 2010   (KR) .................. 10-2010-0037962

(51) Int. Cl.
*G02F 1/1335*   (2006.01)
(52) U.S. Cl.
USPC .................................. 349/65; 349/70; 349/96
(58) Field of Classification Search
USPC ................................................ 349/65, 70, 96
See application file for complete search history.

(56) References Cited

U.S. PATENT DOCUMENTS

| 7,527,410 B2 * | 5/2009 | Yoshizawa et al. | 362/615 |
| 7,614,757 B2 * | 11/2009 | Nesterenko et al. | 362/19 |
| 8,314,902 B2 * | 11/2012 | Kim et al. | 349/96 |

* cited by examiner

*Primary Examiner* — Mike Qi
(74) *Attorney, Agent, or Firm* — Morgan, Lewis & Bockius LLP

(57) ABSTRACT

Disclosed is a transparent display device for enhancing image quality, and the transparent display device may include liquid crystal display panel; a light source disposed at one side of a lower portion of the liquid crystal display panel to emit light; a first polarizing plate to first-polarize the light emitted from the light source; a light guide plate at a lower portion of the liquid crystal display panel to receive the light first-polarized by the first polarizing plate through a lateral surface thereof, a pattern being formed on the upper surface of the light guide plate to output the incident first-polarized light in a lower direction of the light guide plate; a second polarizing plate at an upper portion of the liquid crystal display panel to control the amount of light transmitting the liquid crystal display panel; and a first optical sheet at a lower portion of the light guide plate to reflect the first-polarized light received from the light guide plate, and transmit a second polarization component of natural light received from the lower portion thereof.

10 Claims, 5 Drawing Sheets

$\frac{a}{b}=0.0344$  $\frac{a}{b}=0.1824$

ELLIPTICAL DIRECTION −88.24°   ELLIPTICAL DIRECTION −87.97°

(a)   (b)

TRANSPARENT DISPLAY DEVICE

BACKGROUND OF THE INVENTION

1. Field of the Invention

The present invention relates to a transparent display device, and more particularly, to a transparent display device in which a pattern is formed on an upper surface of a light guide plate to reflect all light entered into the light guide plate to an optical sheet disposed at a lower portion of the light guide plate, and then supply the light reflected by the optical sheet to a liquid crystal display panel, thereby enhancing image quality.

2. Description of the Related Art

In recent years, with rising interests in information display devices and increasing demands to use portable information media, researches and commercialization of light-weight and thin-profile flat panel displays (FPDs) for substituting traditional display devices such as cathode ray tubes (CRTs) have been actively carried out. In particular, among such FPDs, a liquid crystal display (LCD), which is a device displaying images using an optical anisotropy of liquid crystal molecules, has been actively applied to a notebook, a desktop monitor, or the like, because it is excellent in resolution, color representation, image quality, and the like.

On the other hand, studies on a transparent display device for allowing an object in a rear side thereof to be seen as well as capable of implementing an image thereon have been actively carried out. Such a transparent display device may be applicable to vehicle front glasses or house glasses to provide the user's desired information. Therefore, the applicability of such transparent display devices may be expected to be drastically increased.

In general, for the transparent display device, an organic light-emitting display device or the like using spontaneous light may be used.

However, in case of the organic light-emitting display device, a display device thereof can be made only to be transparent, and thus it may be impossible to turn on or off the transparency to make it transparent or implement an image thereon. Also, there are various problems such as low yield, difficulty in making a large-sized display, low reliability, and the like.

As a result, it may be required to develop a liquid crystal display device capable of implementing high yield, large-sized displays, high reliability, as well as capable of implementing wide viewing angle, high luminance, high contrast ratio and full color as a transparent display device, but the liquid crystal display device cannot be used as a transparent display device. It is because the liquid crystal display is a device incapable of spontaneously emitting light but implementing an image by using light of the backlight, and thus a non-transparent backlight unit should be provided at a rear surface of the liquid crystal display panel and also polarizing plates should be provided at both front and rear surfaces of the liquid crystal display panel, respectively, to control the transmission of light. In particular, the polarizing plates provided at both front and rear surfaces of the liquid crystal display panel, respectively, allows light to be passed therethrough when liquid crystals are driven in the liquid crystal display panel, but light is in a non-transparent state when liquid crystals are not driven, and thus it is impossible to implement a transparent display.

SUMMARY OF THE INVENTION

The present disclosure is contrived to solve the aforementioned problem and one aspect of the detailed description is to provide a transparent display device allowing a user to view an object in a rear surface of the display device.

Another aspect of the detailed description is to provide a transparent display device in which a pattern is formed on an upper surface of a light guide plate to reflect all light entered into the light guide plate to an optical sheet disposed at a lower portion of the light guide plate, and then supply the light reflected by the optical sheet to a liquid crystal display panel, thereby enhancing image quality.

In order to accomplish the foregoing object, a transparent display device according to the present invention may include a liquid crystal display panel; a light source disposed at one side of a lower portion of the liquid crystal display panel to emit light; a first polarizing plate to first-polarize the light emitted from the light source; a light guide plate at a lower portion of the liquid crystal display panel to receive the light first-polarized by the first polarizing plate through a lateral surface thereof, a pattern being formed on the upper surface of the light guide plate to output the incident first-polarized light in a lower direction of the light guide plate; a second polarizing plate at an upper portion of the liquid crystal display panel to control the amount of light transmitting the liquid crystal display panel; and a first optical sheet at a lower portion of the light guide plate to reflect the first-polarized light received from the light guide plate, and transmit a second polarization component of natural light received from the lower portion thereof.

Here, a transmission axis of the first polarizing plate may be perpendicular to a transmission axis of the second polarizing plate and parallel to a reflection axis of the first optical sheet.

Furthermore, a transparent display device according to the present invention may further include a reflection plate at one lateral surface side of the light guide plate opposing to the other lateral surface at which the light source is disposed to reflect light totally-reflected and outputted from the light guide plate; and a third polarizing plate between a lateral surface of the light guide plate and the reflection plate to transmit the first-polarized light of light outputted from the lateral surface of the light guide plate and transmit the first-polarized light of light reflected from the reflection plate.

Furthermore, a transparent display device according to the present invention may further include a second optical sheet at one lateral surface of the light guide plate opposing to the lateral surface at which the light source is disposed to reflect the first-polarized light outputted from a lateral surface of the light guide plate.

According to the present invention, a pattern is formed on an upper surface of a light guide plate to totally reflect all light entered into the light guide plate to an optical sheet disposed at a lower portion of the light guide plate, and then supply the light reflected by the optical sheet to a liquid crystal display panel, thereby enhancing image quality.

In addition, according to the present invention, a reflection plate or optical sheet is disposed at a lateral surface of the light guide plate to reflect light outputted through the lateral surface of the light guide plate and supply it again to the light guide plate, thereby further enhancing image quality.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the present invention will be described in detail with reference to the accompanying drawings.

According to the present invention, there is provided a transparent display device. In other words, according to the present invention, there is provided a display device allowing the user to view an object in a rear surface of the display device. Here, when a signal is applied to the transparent display device, not only an object in a rear surface of the display device but also the user's desired image may be displayed on the transparent display device.

Moreover, according to the present invention, there is provided a transparent display device capable of enhancing image quality in the display device. For this purpose, according to the present invention, a pattern for totally reflecting light is formed on an upper surface of the light guide plate and an optical sheet for reflecting light polarized in a specific direction is provided at a lower portion of the light guide plate, thereby supplying light having an enhanced linear polarization characteristic to a liquid crystal display panel.

Figure 1:
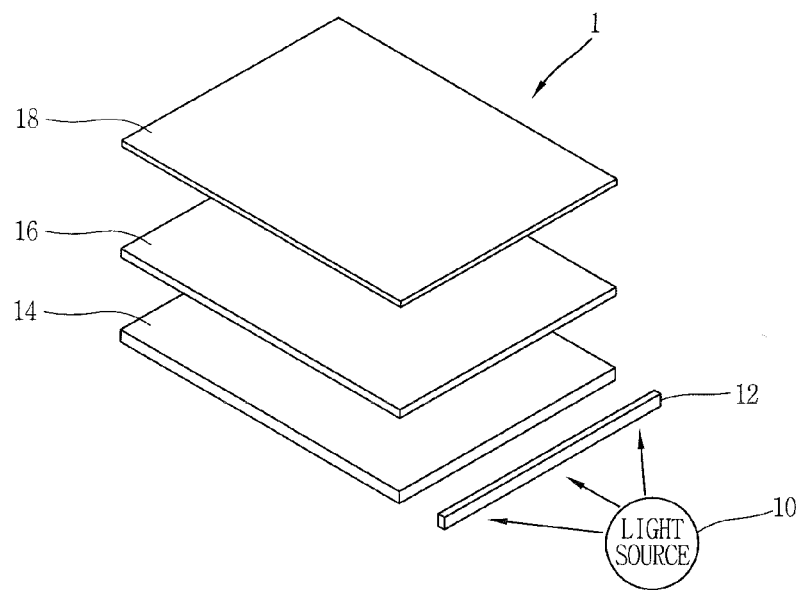
FIG. 1 is an exploded perspective view illustrating the structure of a transparent display device according to a first embodiment of the present invention.

FIG. 1 is a view illustrating the structure of a transparent display device 1 according to a first embodiment of the present invention.

As illustrated in FIG. 1, a transparent liquid crystal display device 1 according to a first embodiment of the present invention may include a liquid crystal display panel 16, a light guide plate 14 disposed at a lower portion of the liquid crystal display panel 16 to guide light to the liquid crystal display panel 16, a light source 10 disposed at a lateral surface of the light guide plate 14 to emit light to the light guide plate 14, a first polarizing plate 12 disposed between the light source 10 and a lateral surface of the light guide plate 14 to polarize the light emitted from the light source to enter into the light guide plate 14, and a second polarizing plate 18 disposed at an upper portion of the liquid crystal display panel 16 to polarize light passing through the liquid crystal display panel 16.

Though not shown in the drawing, the liquid crystal display panel 16 is comprised of a thin-film transistor array substrate, a color filter substrate, and a liquid crystal layer therebetween, thereby implementing an image when a signal is applied from the outside. The thin-film transistor array substrate is formed with a plurality of gate lines and data lines vertically and horizontally arranged to define a plurality of pixel regions, and each pixel region is formed with a thin-film transistor which is a switching device, and formed with a pixel electrode formed on the pixel region. In addition, the thin-film transistor may include a gate electrode connected to the gate line, a semiconductor layer formed by depositing amorphous silicon or the like on the gate electrode, and a source electrode and a drain electrode formed on the semiconductor layer and connected to the data line and pixel electrode.

The color filter substrate may include a color filter (C) configured with a plurality of sub-color filters for implementing red (R), green (G), and blue (B) colors, and a black matrix for dividing between the sub-color filters and blocking light passing through the liquid crystal layer.

The thin-film transistor array substrate and color filter substrate configured as described above are adhered by facing each other by a sealant (not shown) formed at an outside of the image display region to constitute a liquid crystal display panel, and the adhesion between the thin-film transistor array substrate and color filter substrate is achieved by an alignment key formed on the thin-film transistor array substrate and color filter substrate.

The light source 10 is disposed in a lateral direction of the light guide plate 14. For the light source 10, it may be used a fluorescent lamp such as a cold cathode fluorescence lamp (CCFL) or external electrode fluorescent lamp (EEFL), or a plurality of light emitting devices (LEDs). In case of using LEDs, it may be used an LED emitting monochromatic light such as red, green, blue, and the like or a white LED emitting white light.

The light emitted from the light source 10 may include a first polarized light (vertical polarized light) and a second polarized light (horizontal polarized light) as visible light. The transmission axes of the first polarizing plate 12 disposed at a lateral portion of the light guide plate 14 and the second polarizing plate 18 disposed at an upper portion of the liquid crystal display panel 16 are perpendicular to each other. In other words, the first polarizing plate 12 transmits only first-polarized light from the light including first-polarized light (for example, S-wave) and second-polarized light (for example, P-wave) and the second polarizing plate 18 transmits only second-polarized light.

Though not shown in the drawing, the first polarizing plate 12 and second polarizing plate 18 may include a polarizing body, and a first supporting body and a second supporting body adhered to both surfaces of the polarizing body. The polarizing body is a film capable of converting natural light into any polarized light. Here, when incident light is divided into two polarized components crossed each other at a right angle, it may be used the polarizing body having the function of allowing one polarized component to be passed therethrough but the other polarized component to be absorbed, reflected or scattered therein. An optical film used in the polarizing body is not particularly limited, but it may be used, for example, a high molecular film in which a polyvinyl alcohol (PVA)-based resin containing iodine or two-color dye is used as a main component, an O-type polarizing body in which liquid crystal compositions containing a two-color material and a liquid crystal compound are aligned in a predetermined direction, and an E-type polarizing body in which lyotropic liquid crystals are aligned in a predetermined direction, or the like.

The first supporting body and second supporting body are provided to protect the polarizing body, which are mainly made of a film-type material. Accordingly, any type of protective film may be used if it is possible to protect the polarizing body. For example, a triacetyl cellulose (TAC) or a triacetyl cellulose with no phase difference (Rth) (zero retardation TAC) may be used for the first supporting body and second supporting body.

Figure 2:
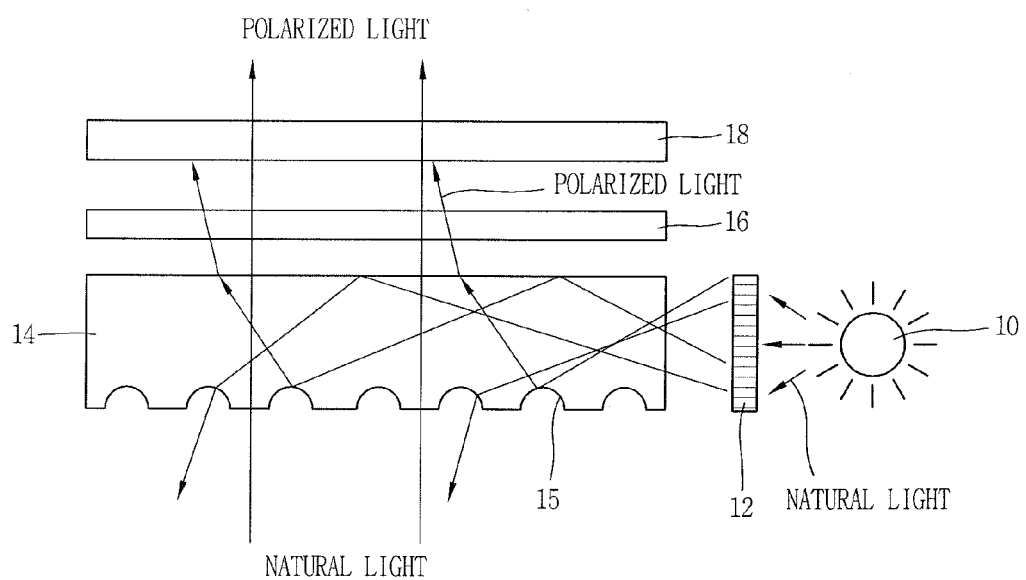
FIG. 2 is a front view illustrating of a transparent display device according to a first embodiment of the present invention.

FIG. 2 is a front view of FIG. 1, and the driving of a transparent display device 1 according to a first embodiment of the present invention will be described below with reference to FIG. 2.

As illustrated in FIG. 2, if the light emitted from the light source 10 is entered into the first polarizing plate 12, then a second-polarized component of the light (for example, P-wave) is absorbed by the first polarizing plate 12 to transmit only a first-polarized light (for example, S-wave) through the first polarizing plate 12. The light guide plate 14 allows the first-polarized light that has passed through the first polarizing plate 12 to be entered into the liquid crystal display panel 16 at an upper portion thereof.

The light guide plate 14 is composed of a transparent material having a high optical transmissivity such acryl, polycarbonate, epoxy, polymethyl methacrylate, and the like to guide incident light to the liquid crystal display panel 16. Here, a pattern 15 is formed at a lower portion of the light guide plate 14.

The light guide plate 14 passes natural light received from the rear surface therethrough as it is to supply it to the liquid crystal display panel 16, and totally reflects polarized light received from the lateral surface to supply it to the liquid crystal display panel 16.

Typically, the total reflection of light entered to a lateral surface of the light guide plate 14 is generated by a difference between the refractive index of the light guide plate 14 and the refractive index of air. In other words, when light is received from a lateral surface of the light guide plate 14 and incident on an interface between the light guide plate 14 and the air at a specific angle due to a difference between the refractive index of the light guide plate 14 (about 1.49 in case of polymethyl methacrylate which is typically used) and the refractive index of air (i.e., 1), the light polarized on the interface is totally reflected and supplied to the liquid crystal display panel 16.

The total reflection of light is determined by Snell's law. Snell's law is illustrated as n2 sin θ1=n1 sin θ2, wherein n1 and n2 are the refractive indices of the air and light guide plate, respectively, and θ1 and θ2 indicate an incident angle and an exit angle of light on the interface, respectively.

Figure 3:
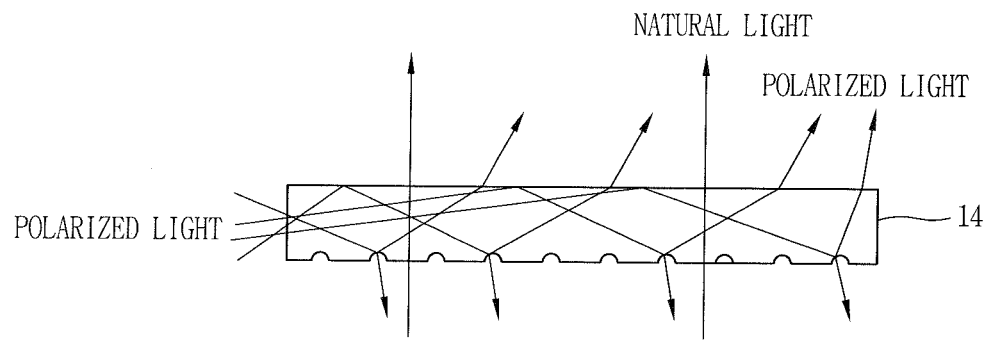
FIG. 3 is a view illustrating the structure of a light guide plate according to a first embodiment of the present invention.

As illustrated in FIG. 3, when light received through a lateral surface of the light guide plate 14 is entered at an angle of φ to the interface between the light guide plate 14 and the air, the exit angle should be greater than 90 degrees to totally reflect all light at the interface between the light guide plate 14 and the air.

In other words, the relation of n2 sin φ≧n1 sin 90° should be satisfied. Here, n1 is 1 and n2 is about 1.49, and thus φ≧sin⁻¹(1/1.49)=42.16°. In other words, when light is entered into the interface between the light guide plate 14 and the air at an angle greater than 42.16°, all light is totally reflected and supplied to the liquid crystal display panel 16.

As a result, all light entered to the interface between the light guide plate 14 and the air at an incident angle greater than 42.16° is totally reflected and supplied to the liquid crystal display panel 16, but light entered at an incident angle less than 42.16° is not reflected into the light guide plate 14 at the interface between the light guide plate 14 and the air but refracted to be exited to a lower portion of the light guide plate 14. In this manner, when light is exited to a lower portion of the light guide plate 14, the efficiency of light supplied to the liquid crystal display panel 16 is decreased, thereby reducing luminance in an image mode of the transparent liquid crystal display device.

A pattern 15 formed at a lower portion of the light guide plate 14 minimizes the amount of light to be exited out of the light guide plate 14 at the interface between the light guide plate 14 and the air as described above. In other words, as illustrated in FIG. 2, the incident angle of light entered to the interface between the light guide plate 14 and the air is changed by the pattern 15 to increase the ratio of light totally reflected at the interface between the light guide plate 14 and the air, thereby enhancing the luminance of light supplied to the liquid crystal display panel 16.

In the structure illustrated in FIG. 2, when the liquid crystal display device is turned off, i.e., when a signal is not applied to the liquid crystal display panel 16, the S-wave emitted from the light source 10 and first-polarized by the first polarizing plate 12 is totally reflected at the light guide plate 14 and then passed as it is through a liquid crystal layer of the liquid crystal display panel 16. At this time, the transmission axes of the first polarizing plate 12 and second polarizing plate 18 are perpendicular to each other, and thus the S-wave passed as it is through the liquid crystal display panel 16 is unable to be passed through the second polarizing plate 18, thereby displaying black.

When the liquid crystal display device is turned on, i.e., when a signal is applied to the liquid crystal display panel 16, the S-wave emitted from the light source 10 and polarized by the first polarizing plate 12 and then totally reflected at the light guide plate 14 changes its polarization state while passing through a liquid crystal layer of the liquid crystal display panel 16 to be a P-wave and becomes parallel to a transmission axis of the second polarizing plate 18, and thus the P-wave is passed through the second polarizing plate 18, thereby displaying white.

In addition, if the intensity of power applied to the liquid crystal display panel 16 is suitably adjusted, then it may be possible to suitably control the arrangement of liquid crystals in the liquid crystal layer of the liquid crystal display panel 16, thereby adjusting the level of retardation. As a result, when the liquid crystal display panel 16 is turned on, the transmissivity of light passing through the liquid crystal layer is controlled, thereby displaying gray level.

On the other hand, natural light supplied to the liquid crystal display panel 16 through the light guide plate 14 at a lower portion of the light guide plate 14 is entered into the liquid crystal display panel 16 through the light guide plate 114 and then transmitted as it is, thereby displaying an object in a rear surface of the display device in a transparent mode.

Figure 4:
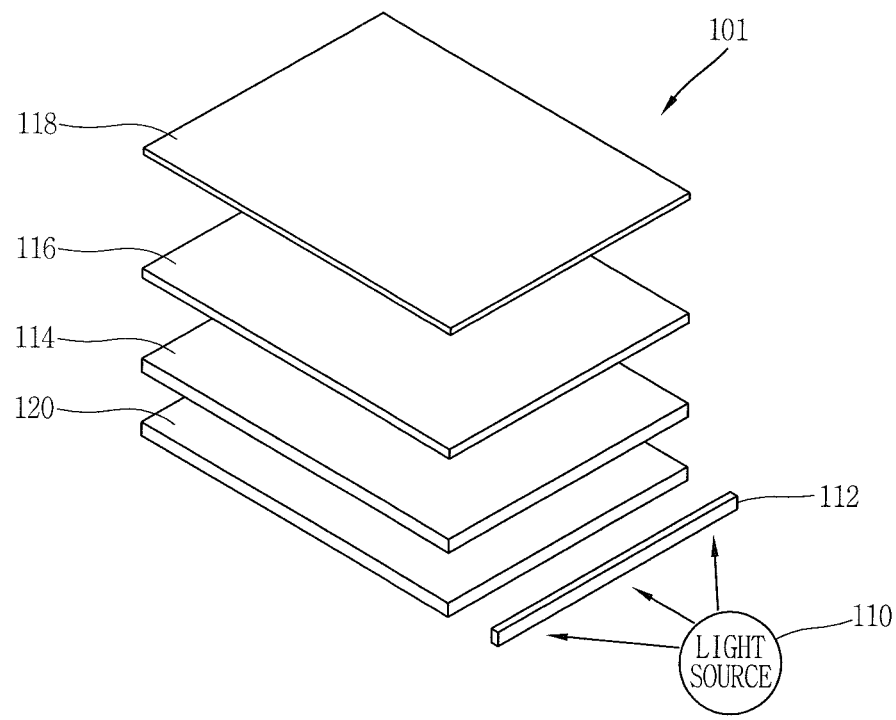
FIG. 4 is an exploded perspective view illustrating the structure of a transparent display device according to a second embodiment of the present invention.
Figure 5:
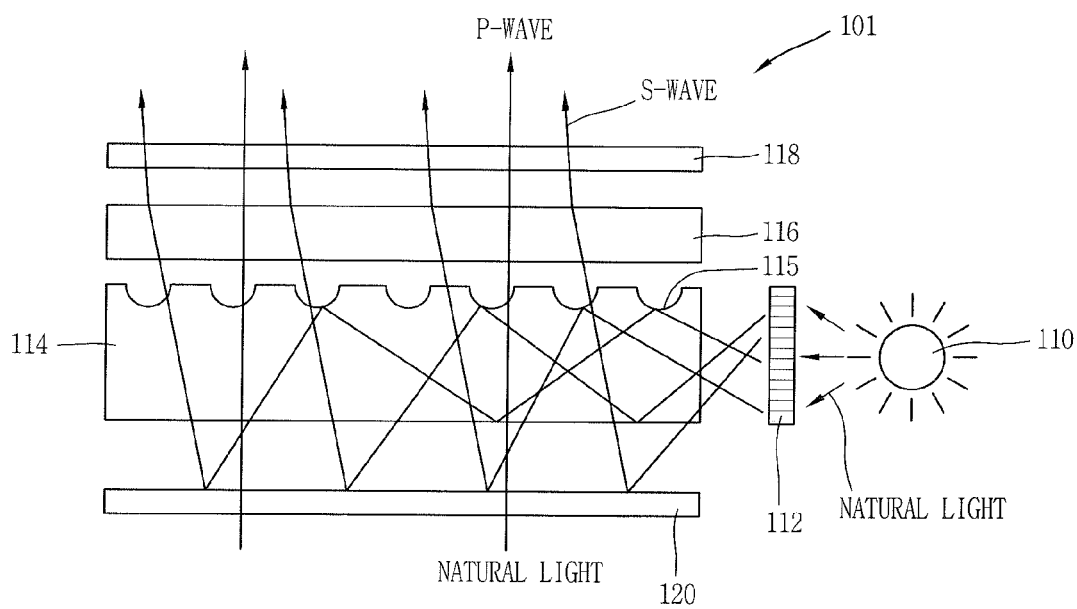
FIG. 5 is a front view illustrating of a transparent display device according to a second embodiment of the present invention.

FIGS. 4 and 5 are views illustrating the structure of a transparent display device 101 according to a second embodiment of the present invention, wherein FIG. 4 is an exploded perspective view and FIG. 5 is a front view.

As illustrated in FIGS. 4 and 5, a transparent display device 101 according to this embodiment may include a liquid crystal display panel 116, a light guide plate 114 disposed at a lower portion of the liquid crystal display panel 116 to guide light to the liquid crystal display panel 116, a light source 110 disposed at a lateral portion of the light guide plate 114 to emit light to the light guide plate 114, a first polarizing plate 112 disposed between the light source 110 and a lateral surface of the light guide plate 114 to polarize the light emitted from the light source to enter into the light guide plate 114, a second polarizing plate 118 disposed at an upper portion of the liquid crystal display panel 116 to polarize light passing through the liquid crystal display panel 116, and an optical sheet 120 disposed at a lower portion of the liquid crystal display panel 116.

Here, the transmission axes of the first polarizing plate 112 disposed at a lateral portion of the light guide plate 114 and the second polarizing plate 118 are perpendicular to each other. In other words, the first polarizing plate 112 transmits only first-polarized light from the light including first-polarized light (for example, S-wave) and second-polarized light (for example, P-wave) and the second polarizing plate 118 transmits only second-polarized light. Furthermore, a transmission axis of the optical sheet 120 is perpendicular to a transmission axis of the first polarizing plate 112 and second polarizing plate 118, and a reflection axis thereof is parallel to a transmission axis of the first polarizing plate 112 and second polarizing plate 118.

As illustrated in FIG. 5, a pattern 115 is formed on an upper surface of the light guide plate 114. It will be described below why the pattern 115 is formed on an upper surface of the light guide plate 114 in this embodiment whereas a pattern 15 is formed at a lower surface of the light guide plate 14 in the first embodiment of the present invention illustrated in FIG. 2.

In the first embodiment, the S-wave emitted from the light source 10 located at a lateral portion of the light guide plate 14 and polarized by the first polarizing plate 12 is entered into the light guide plate 14 through a lateral surface of the light guide plate 14, and then subjected to several total reflections inside the light guide plate 14 and supplied to the liquid crystal display panel 16 disposed at an upper portion of the light guide plate 14. Particularly, most light is reflected by the pattern 15 disposed at a lower portion of the light guide plate 14 and exited to a side of the upper portion thereof.

However, light entered to the pattern 15 at a specific angle, among the light entered an interface between the light guide plate 14 and the air at an incident angle less than 42.16°, is not reflected by the pattern 15 but exited to a lower portion of the light guide plate 14 in a refracted state. In this manner, when light is exited to a lower portion of the light guide plate 14, the efficiency of light supplied to the liquid crystal display panel 16 is decreased, thereby reducing luminance in an image mode of the transparent display device.

Furthermore, the polarization state of the S-wave (first-polarized light) received through a lateral surface of the light guide plate 14 is broken while being entered to the lateral surface of the light guide plate 14, and the polarization state of the light is broken while being subjected to several total reflections inside the light guide plate 14, and thus the light is supplied to the liquid crystal display panel 16 in an elliptically polarized state through an upper surface of the light guide plate 14.

Figure 6:
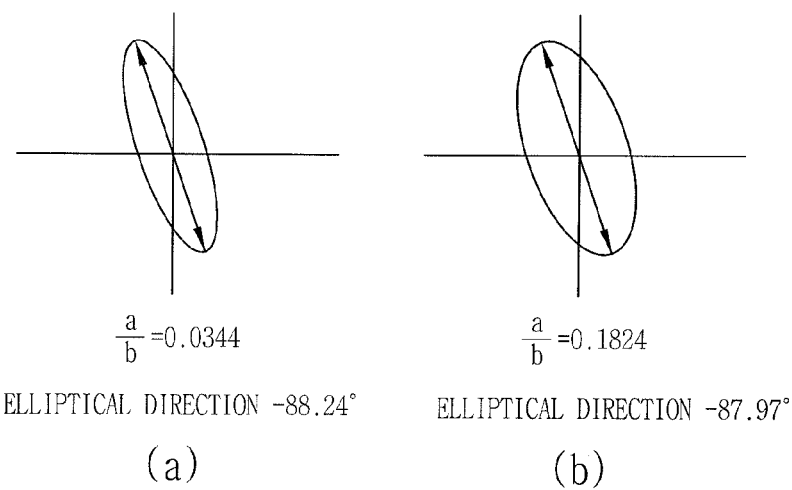
FIGS. 6a and 6b are views illustrating a polarization state of light supplied to a liquid crystal display panel in a typical liquid crystal display device and a transparent liquid crystal display device, respectively.

FIGS. 6a and 6b are views illustrating a polarization state of light supplied to the liquid crystal display panel in a typical liquid crystal display device and a transparent liquid crystal display device according to a first embodiment of the present invention, respectively.

As illustrated in FIGS. 6a and 6b, the polarization state of light supplied to the liquid crystal display panel is about 0.0344 in a typical liquid crystal display device whereas the polarization state of light supplied to the liquid crystal display panel is about 0.1824 in a transparent liquid crystal display device. As a result, it is seen that the polarization efficiency of light supplied to the liquid crystal display panel is reduced by about 430% in a transparent liquid crystal display device according to a first embodiment of the present invention compared to a typical liquid crystal display device.

In this manner, an elliptically polarized light is supplied to the liquid crystal display panel 16 compared to a typical liquid crystal display device when light near to a complete S-wave is supplied to the liquid crystal display panel 16 in a transparent liquid crystal display device according to the first embodiment of the present invention, and thus other components except the S-wave component are absorbed in the second polarizing plate 18 and only the S-wave is passed through the second polarizing plate 18, thereby resulting in a problem that luminance is reduced compared to a complete S-Wave when polarization is broken by the light guide plate 14 as described above.

However, in case of a transparent display device according to a second embodiment of the present invention, the pattern 115 is disposed at an upper portion of the light guide plate 114, and thus most of light entered to the upper portion as well as light entered to a lateral surface of the light guide plate 114 to be entered to a lower surface of the light guide plate 114 is reflected by the pattern 115 and exited through the lower surface of the light guide plate 114. At this time, the light exited to the lower surface of the light guide plate 114 arrives at the optical sheet 120, and an S-wave of the light arrived at the optical sheet 120 is reflected to be supplied again to the liquid crystal display panel 116 through the light guide plate 114 because a reflection axis of the optical sheet 120 is parallel to a transmission axis of the first polarizing plate 112 and a transmission axis thereof is perpendicular to a transmission axis of the first polarizing plate 112.

In this manner, according to this embodiment, the S-wave totally reflected and partially polarized by the pattern 115 and the like at an upper surface of the light guide plate 114 is reflected at the optical sheet 120 disposed at a lower portion of the light guide plate 114 to be supplied again to the liquid crystal display panel 116, and thus the absorption of optical components at the second polarizing plate 118 is reduced compared to the transparent display device disclosed in the first embodiment, thereby resulting in enhanced luminance compared to the structure disclosed in the first embodiment.

Figure 7:
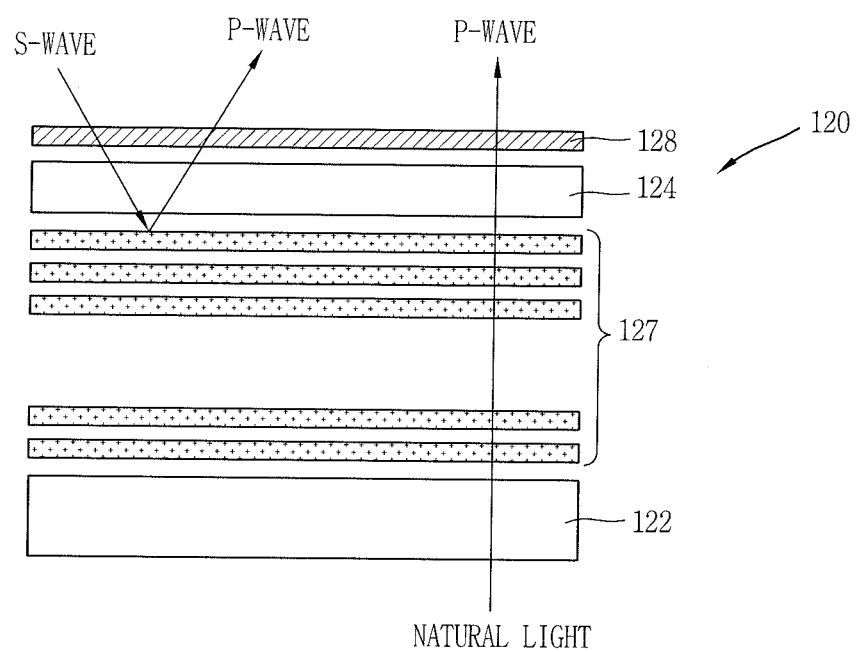
FIG. 7 is a view illustrating an optical sheet of a transparent display device according to a second embodiment of the present invention.

On the other hand, the optical sheet 120 reflects an S-wave of the incident light and transmits a P-wave thereof, and the structure of the optical sheet 120 is disclosed in FIG. 7.

As illustrated in FIG. 7, the optical sheet 120 may include a first base film 122 and a second base film 124, and a polarizing portion 127 consisted of several hundreds sheets of isotropic media and high-birefringent anisotropic media disposed between the first base film 122 and the second base film 124 to transmit a P-wave component of the incident light and reflect an S-wave component thereof.

The first base film 122 and second base film 124 are transparent films, formed of a material such as polyester (PET), polymethyl methacrylate (PMMA), poly carbonate (PC) or the like.

However, the optical sheet 120 according to the present invention is not merely limited to the structure illustrated in FIG. 7. Any optical sheet with a structure capable of transmitting light having a specific polarization direction and reflecting light with other directions may be also applicable to the present invention.

For example, dual brightness enhancement film or cholesteric liquid crystal film may be used as an optical sheet.

The driving of a transparent display device having the foregoing structure according to a second embodiment of the present invention will be described in detail with reference to FIG. 5.

As illustrated in FIG. 5, light emitted from the light source 110 and passed through the first polarizing plate 112 is polarized to be an S-wave, and the S-wave is received through a lateral surface of the light guide plate 114. The light (for example, S-wave) entered into one lateral surface of the light guide plate 114 is totally reflected inside the light guide plate 114 and advanced to the other lateral surface while at the same time being supplied to the optical sheet 120 through a lower surface of the light guide plate 114. At this time, the light received at a predetermined angle through the lateral surface of the light guide plate 114 is totally reflected by the pattern 115 because the pattern 115 is formed at an upper surface of the light guide plate 114, and thus the S-wave polarized by the first polarizing plate 112 (strictly speaking, S-wave including an elliptically polarized component with partially broken polarization) is not directly supplied to the liquid crystal display panel 116 through an upper surface of the light guide plate 114.

The S-wave totally reflected inside the light guide plate 114 and exited through a lower surface of the light guide plate 114 is entered into the optical sheet 120.

As illustrated in FIG. 7, the S-wave received through an upper portion of the optical sheet 120 is passed through a diffusion layer 128 and a first base film 124, and then reflected at the polarizing portion 127. As described above, the optical sheet 120 transmits a P-wave and reflects an S-wave, and thus the S-wave received from an upper portion of the optical sheet 120 is reflected at the polarizing portion 127 and then entered again into the light guide plate 114. The S-wave reflected at the polarizing portion 127 of the optical sheet 120 is passed through the liquid crystal display panel 116, and then entered into the second polarizing plate 118.

At this time, a transmission axis of the second polarizing plate 118 is perpendicular to a reflection axis of the optical sheet 120, and thus only the P-wave is passed therethrough and the S-wave is absorbed therein.

When the liquid crystal display device is turned off, i.e., when a signal is not applied to the liquid crystal display panel 116, the S-wave reflected at the polarizing portion 127 of the optical sheet 120 is passed as it is through a liquid crystal layer of the liquid crystal display panel 116 but unable to be passed through the second polarizing plate 118, thereby displaying black.

When the liquid crystal display device is turned on, i.e., when a signal is applied to the liquid crystal display panel 116, the S-wave reflected at the polarizing portion 127 of the optical sheet 120 changes its polarization state while passing as it is through a liquid crystal layer of the liquid crystal display panel 116 to be a P-wave, and thus the P-wave is passed through the second polarizing plate 118, thereby displaying white.

In addition, if the intensity of power applied to the liquid crystal display panel 116 is suitably adjusted, then it may be possible to suitably control the arrangement of liquid crystals in the liquid crystal layer of the liquid crystal display panel 116, thereby adjusting the level of retardation. As a result, when the liquid crystal display panel 116 is turned on, the transmissivity of light passing through the liquid crystal layer is controlled, thereby displaying gray level.

On the other hand, if natural light supplied to the liquid crystal display panel 116 through the light guide plate 114 at a lower portion of the light guide plate 114 is entered into the optical sheet 120, then a P-wave of the natural light is passed through the polarizing portion 127 but an S-wave thereof is reflected at the polarizing portion 127 and exited again to the outside. When a signal is not applied to the liquid crystal display panel 116, the P-wave is passed through the light guide plate 114 to be supplied to the liquid crystal display panel 116 and then passed as it is through the second polarizing plate 118, thereby displaying white.

When a signal is applied to the liquid crystal display panel 116, the state of light entered into the liquid crystal display panel 116 is changed to become an S-wave while passing through the liquid crystal layer, and the S-wave is entered into the second polarizing plate 118 and absorbed at the second polarizing plate 118, thereby displaying black.

Even at this time, an object in the rear surface of the liquid crystal display device can be seen with a desired gray level by suitably adjusting the intensity of power applied to the liquid crystal display panel 116.

In this manner, according to a second embodiment of the present invention, the pattern 115 is formed at an upper surface of the light guide plate 114 to totally reflect all light entered into the light guide plate 114 and again transmit only an S-wave polarized by the optical sheet 120 and supply it to the liquid crystal display panel 116 through the light guide plate 114, and thus light is prevented from being outputted to a lower portion of the light guide plate 114 in an image mode and all light is supplied to the liquid crystal display panel 116, thereby enhancing the luminance of the liquid crystal display panel 116. Furthermore, the S-wave in a broken polarization state when entered and totally reflected at the light guide plate 114 is reflected at the optical sheet 120 to become a complete shaped S-wave again and applied to the liquid crystal display panel 116, and thus optical absorption by the second polarizing plate 118 can be minimized, thereby further enhancing the luminance of the liquid crystal display panel 116.

Figure 8A:
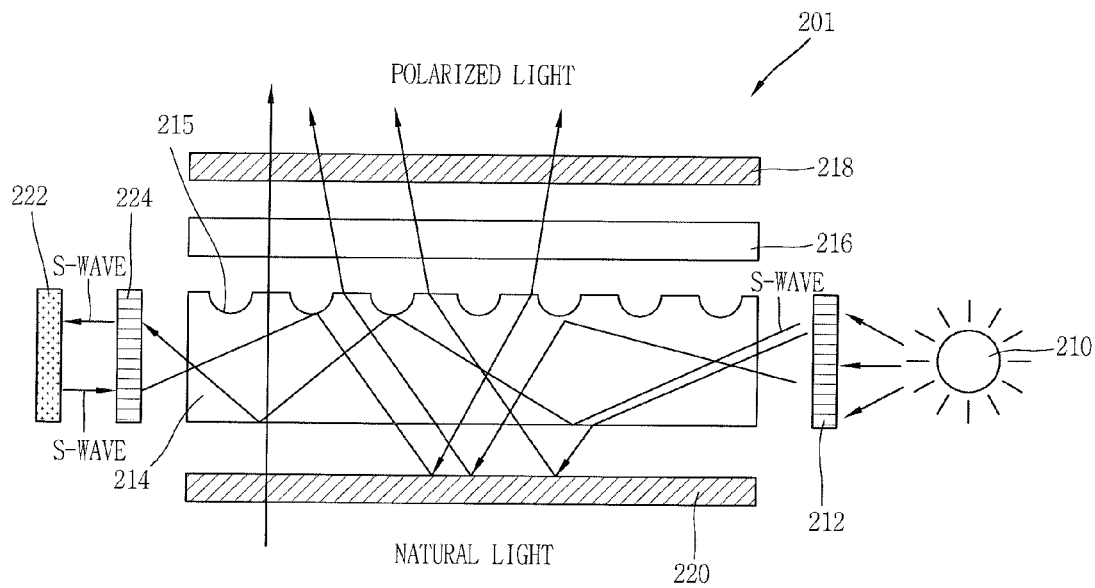
FIGS. 8a and 8b are front views illustrating a transparent display device according to a third embodiment of the present invention.
Figure 8B:
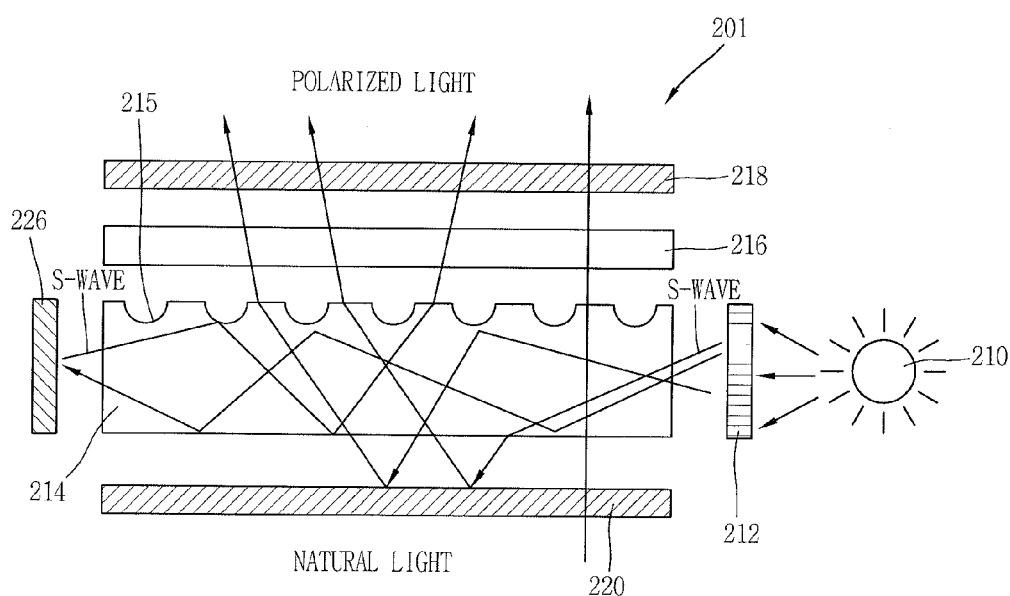

FIGS. 8a and 8b are views illustrating the structure of a transparent display device according to a third embodiment of the present invention.

As illustrated in FIG. 8a, a transparent display device 201 according to this embodiment may include a liquid crystal display panel 216, a light guide plate 214 disposed at a lower portion of the liquid crystal display panel 216 to guide light to the liquid crystal display panel 216, a light source 210 disposed at a lateral portion of the light guide plate 214 to emit light to the light guide plate 214, a first polarizing plate 212 disposed between the light source 210 and a lateral surface of the light guide plate 214 to polarize the light emitted from the light source to enter into the light guide plate 214, a second polarizing plate 218 disposed at an upper portion of the liquid crystal display panel 216 to polarize light passing through the liquid crystal display panel 216, and an optical sheet 220 disposed at a lower portion of the liquid crystal display panel 216 to reflect light received from the light guide plate 214 again to the light guide plate 214, a reflection plate 222 disposed at the other portion of the light guide plate 214 to reflect light exited to a lateral surface of the light guide plate 214 and reflect again to a lateral surface of the light guide plate 214, and a third polarizing plate 224 disposed between a lateral surface of the light guide plate 214 and the reflection plate 222 to polarize light exited through a lateral surface of the reflection plate 222 and light reflected at the light guide plate 214.

The structure of a transparent display device 201 illustrated in FIG. 8a is same as that of a transparent display device according to a second embodiment of the present invention illustrated in FIG. 5 except the reflection plate 222 and third polarizing plate 224 disposed at a lateral portion of the light guide plate 214. Accordingly, the description of the same structure as that of FIG. 5 and its operation will be omitted.

In this embodiment, a transmission axis of the third polarizing plate 224 is parallel to a transmission axis of the first polarizing plate 212 and a reflection axis of the optical sheet 220 but perpendicular to an absorption axis of the second polarizing plate 218. Accordingly, when light emitted from the light source 210 and passed through the first polarizing plate 212 and received through a lateral surface of the light guide plate 214 is totally reflected several times inside the light guide plate 214 and exited to the other lateral surface of the light guide plate 214, the exited light is reflected by the reflection plate 222 and then entered again into the other lateral surface of the light guide plate 214. At this time, the polarization state of the light entered to the light guide plate 214 and totally reflected inside the light guide plate 214 is partially broken to become an S-wave including an elliptically polarized component. In the S-wave including an elliptically polarized component exited through the other lateral surface of the light guide plate 214, other polarization components thereof are absorbed by the third polarizing plate 224 and only the S-wave is transmitted therethrough, and then reflected at the reflection plate 222, and transmitted again through the third polarizing plate 224 to be supplied to the light guide plate 214.

In other words, in the transparent display device 201 having the foregoing structure, light in a state that light exited to the other lateral surface of the light guide plate 214 is polarized again to a complete S-wave as well as light received from one lateral surface of the light guide plate 214 and totally reflected at the light guide plate 214 by the pattern 215 and the like formed on an upper surface of the light guide plate 214 to be exited to a lower portion of the light guide plate 214 is entered into the optical sheet 220 at a lower portion of the light guide plate 214, and only an S-wave of the incident light is reflected at the optical sheet 220, and thus only a completely linear-polarized S-wave is supplied to the liquid crystal display panel 216 through the light guide plate 214.

As a result, in a transparent display device according to this embodiment, light exited through a lateral surface of the light guide plate 214 is supplied into the light guide plate 214 in a completely linear-polarized S-wave form compared to the transparent display device according to the second embodiment, and thus light exited out of the light guide plate 214 is supplied to the liquid crystal display panel 216 compared to the transparent display device according to the second embodiment, thereby further enhancing the luminance of the liquid crystal display panel 216.

FIG. 8b is a view illustrating a transparent display device according to a third embodiment of the present invention.

The transparent display device 201 in this structure is different from the transparent display device having the structure of FIG. 8a in only the reflection plate and third polarizing plate, and therefore, only those elements will be described and the description of other elements will be omitted.

As illustrated in FIG. 8b, a second optical sheet 226 is disposed at one lateral surface of the light guide plate 214, i.e., a lateral surface opposing to the lateral surface of the light guide plate 214 disposed with the light source 210. The second optical sheet 226 is configured with the same structure as that of the first optical sheet 220 to transmit a P-wave component of the incident light and reflect an S-wave component thereof. As a result, light exited through a lateral surface of the light guide plate 214 is supplied into the light guide plate 214 in a completely linear-polarized S-wave form compared to the transparent display device according to the second embodiment, and thus light exited out of the light guide plate 214 is supplied to the liquid crystal display panel 216 compared to the transparent display device according to the second embodiment, thereby further enhancing the luminance of the liquid crystal display panel 216.

TABLE 1

| | First embodiment | Second embodiment | Third embodiment |
|---|---|---|---|
| Light leakage in a black mode (nit) | 28.92 | 7.34 | 6.52 |
| Contrast ratio | 3.81 | 12.87 | 15.16 |
| Color gamut | 17.5% | 43.90% | 52.09% |

Table 1 illustrates light leakage in a black mode, contrast ratio, and color gamut in a transparent display device according to the first through third embodiments of the present invention.

As illustrated in Table 1, light leakage in a black mode is about 28.92 nit in a transparent display device according to the first embodiment of the present invention whereas light leakage is reduced to 7.34 nit and 6.52 nit in a transparent display device according to the second and third embodiments, respectively. In other words, light leakage in a black mode is reduced by 74.6% and 77.4% in a transparent display device according to the second and third embodiments, respectively, compared to a transparent display device according to the first embodiment, thereby drastically enhancing image quality.

Furthermore, contrast ratio in a transparent display device according to the first embodiment of the present invention is about 3.81 whereas contrast ratio in a transparent display device according to the second and third embodiments is about 12.87 and 15.16, respectively, and as a result, contrast ratio in a transparent display device according to the second and third embodiments is drastically enhanced by about 237% and 297%, respectively, compared to a transparent display device according to the first embodiment.

In addition, color gamut in a transparent display device according to the first embodiment of the present invention is about 17.5% whereas color gamut in a transparent display device according to the second and third embodiments is about 43.9% and 52.09%, respectively, and as a result, color gamut in a transparent display device according to the second and third embodiments is drastically enhanced by about 150% and 197%, respectively, compared to a transparent display device according to the first embodiment.

In this manner, according to the present invention, there is provided a transparent display device for allowing to view an object through a rear surface of the display device. Here, in the transparent display device, an object in a rear surface of the display device will be displayed as well as a desired image will be displayed when a signal is applied.

Moreover, in a transparent display device according to the present invention, a pattern for totally reflecting light is formed at an upper surface of the light guide plate and an optical sheet for reflecting specific directional polarized light is provided at a lower portion of the light guide plate to supply light having an enhanced linear polarization characteristic to the liquid crystal display panel, thereby reducing light leakage in a black mode, enhancing contrast ratio, and enhancing color gamut.

Moreover, a transparent display device of the present invention is not merely limited to a transparent display device with a specific structure. For example, though it has been disclosed a transparent display device having a structure in which a transparent light guide plate is provided and a first polarizing plate is disposed at a lateral surface of the light guide plate to allow the first polarized light to be entered into the liquid crystal display panel through the light guide plate in the detailed description, the present invention is not merely limited to the transparent display device with such a structure, but may be applicable to all kinds of transparent display devices.

What is claimed is:

1. A transparent display device, comprising:
   a liquid crystal display panel;
   a light source disposed at one side of a lower portion of the liquid crystal display panel to emit light;
   a first polarizing plate to first-polarize the light emitted from the light source;
   a light guide plate at a lower portion of the liquid crystal display panel to receive the light first-polarized by the first polarizing plate through a lateral surface thereof, a pattern being formed on the upper surface of the light guide plate to output the incident first-polarized light in a lower direction of the light guide plate;
   a second polarizing plate at an upper portion of the liquid crystal display panel to control the amount of light transmitting the liquid crystal display panel; and
   a first optical sheet at a lower portion of the light guide plate to reflect the first-polarized light received from the light guide plate, and transmit a second polarization component of natural light received from the lower portion thereof.

2. The transparent display device of claim 1, wherein the light source comprises a cathode ray fluorescent lamp or external electrode fluorescent lamp.

3. The transparent display device of claim 1, wherein the light source comprises a light-emitting device (LED).

4. The transparent display device of claim 1, wherein a transmission axis of the first polarizing plate is perpendicular to a transmission axis of the second polarizing plate and is parallel to a reflection axis of the first optical sheet.

5. The transparent display device of claim 1, wherein the first optical sheet comprises:
   a first base film and a second base film; and
   a polarizing portion disposed between the first base film and the second base film to polarize the incident light in a first polarization direction and to output the first polarized light, the polarizing portion converting the first polarized light having a second polarization component to light having a first polarization component.

6. The transparent display device of claim 5, wherein the polarizing portion made of several hundreds sheets of isotropic media and high-birefringent anisotropic media to transmit a P-wave component of the incident light and reflect an S-wave component thereof.

7. The transparent display device of claim 1, further comprising:
   a reflection plate at the other lateral surface side of the light guide plate opposing to the lateral surface at which the light source is disposed to reflect light totally-reflected and outputted from the light guide plate; and
   a third polarizing plate between the other lateral surface of the light guide plate and the reflection plate to transmit the first-polarized light of light outputted from the other lateral surface of the light guide plate and transmit the first-polarized light of light reflected from the reflection plate.

8. The transparent display device of claim 7, wherein a transmission axis of the third polarizing plate is parallel to a transmission axis of the first polarizing plate.

9. The transparent display device of claim 1, further comprising:
   a second optical sheet at the other lateral surface of the light guide plate opposing to the lateral surface at which the light source is disposed to reflect the first-polarized light outputted from the other lateral surface of the light guide plate.

10. The transparent display device of claim 9, wherein a reflection axis of the second optical sheet is parallel to a transmission axis of the first polarizing plate.

* * * * *